A. F. ROBBINS.
CHUCK CLOSER.
APPLICATION FILED JUNE 25, 1917.
1,272,109.
Patented July 9, 1918.
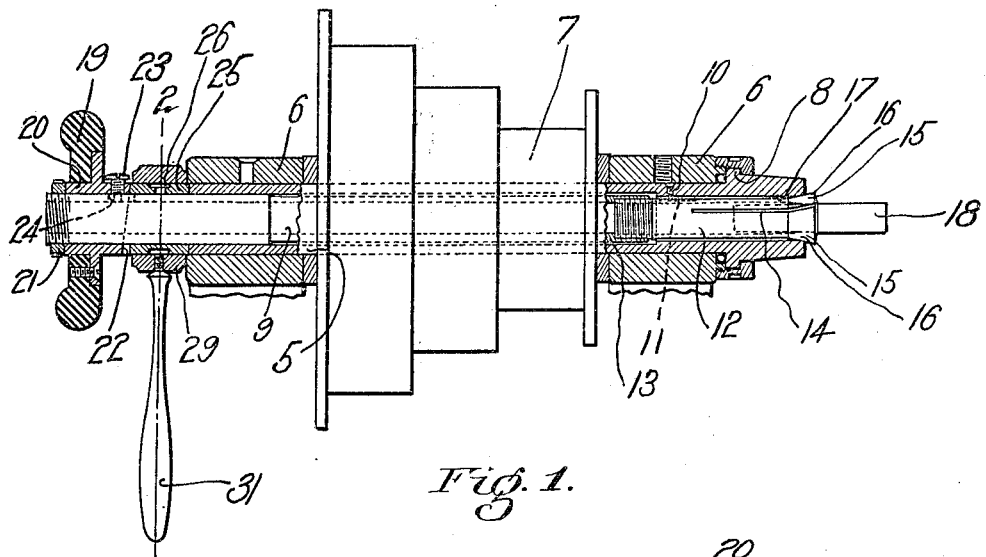
Fig. 1.
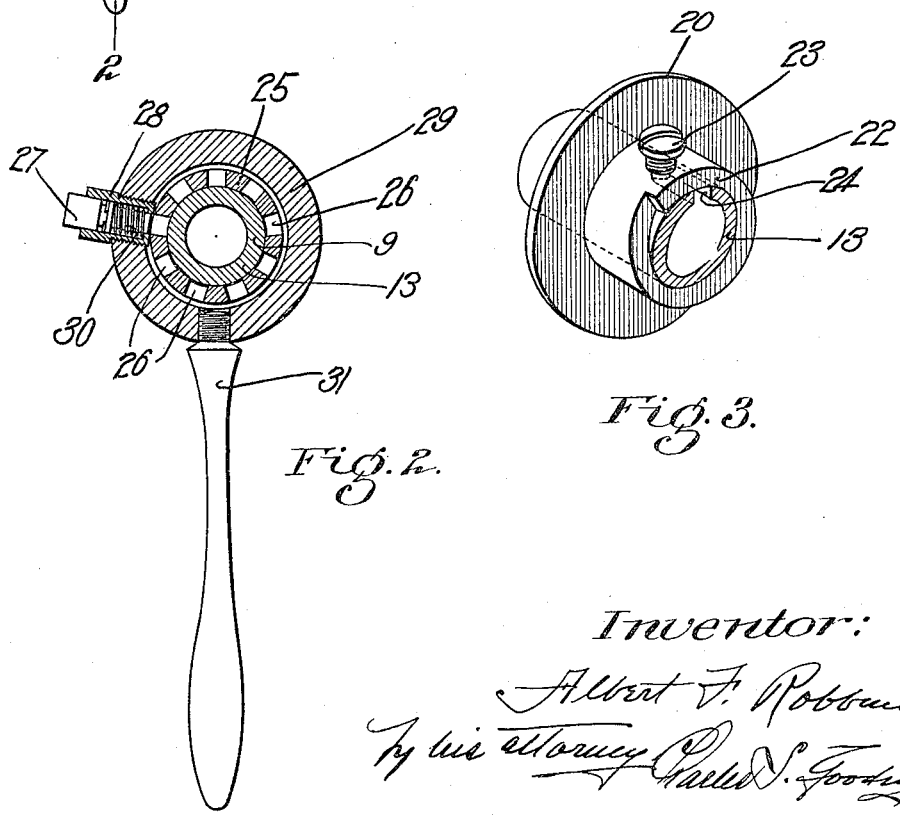
Fig. 2.
Fig. 3.
Inventor:
Albert F. Robbins,
by his attorney

UNITED STATES PATENT OFFICE.

ALBERT F. ROBBINS, OF WALTHAM, MASSACHUSETTS.

CHUCK-CLOSER.

1,272,109.     Specification of Letters Patent.      Patented July 9, 1918.

Application filed June 25, 1917. Serial No. 176,694.

*To all whom it may concern:*

Be it known that I, ALBERT F. ROBBINS, a citizen of the United States, residing at Waltham, in the county of Middlesex and State of Massachusetts, have invented new and useful Improvements in Chuck-Closers, of which the following is a specification.

This invention relates to a chuck particularly adapted to be used in connection with lathes for holding the work in the headstock of a lathe.

The object of the invention is to provide simple, powerful and quickly operated means, for closing the chuck to grip the work in the headstock of a lathe.

The invention consists in the combination and arrangement of parts set forth in the following specification and particularly pointed out in the claims thereof.

Referring to the drawings:

Figure 1 is a sectional elevation of my invention, showing the same embodied in a portion of the headstock of a lathe.

Fig. 2 is a sectional elevation taken on line 2—2 of Fig. 1.

Fig. 3 is a perspective view of one of the cams by means of which the chuck member is actuated to grip the work.

Like numerals refer to like parts throughout the several views of the drawings.

In the drawings, 5 is a hollow shaft rotatably mounted in bearings 6 in the headstock of a lathe, said shaft being rotated by any suitable means, as, for example, by a pulley 7. Said shaft 5 is provided with a shoulder 8 which bears against the front end of the forward bearing 6.

A chuck member 9 is mounted within the hollow shaft 5 and slidable longitudinally thereof, but is prevented from rotating therein by a pin 10 which projects into a slot 11 in the chuck member 9. Said chuck member is made in two parts 12 and 13 which have screw-threaded engagement with each other. The part which constitutes the chuck proper 12 is slitted at 14 to form a plurality of spring-gripping fingers 15, the forward end of said gripping fingers being inclined at 16 to engage the front end of the bore 17 of said hollow shaft, so that when the chuck member 9 is moved toward the left (Fig. 1), the inclined portions 16 of the gripping fingers will engage the forward end of the bore of said shaft 5 and cause said gripping fingers to be forced toward each other to grip the work 18 and hold it firmly in position to be operated upon in the usual well known manner.

The rear end of the chuck member 9 has a hand wheel 19 fast thereto and said hand wheel is provided with a hub 20, one end of which bears against a set-nut 21 which has screw-threaded engagement with the chuck member 9, the other end of said hub being formed upon an incline 22 constituting a cam. The hand wheel 19 is prevented from rotating upon the chuck member 9 by a screw 23, the inner end of which projects into a slot 24 provided in the portion 13 of the chuck member 9.

A collar 25 is rotatably mounted upon the chuck member 9 between the cam-shaped hub 20 and the rear end of the hollow shaft 5. One end of said collar bears against the rear end of said hollow shaft 5 and the other end of said collar is inclined to form a cam which bears against the inclined end 22 of the hub 20. The collar 25, therefore, forms a cam and has a series of radially extending holes 26 extending therethrough, each of said holes being adapted to receive a pin 27 which is slidably mounted in a bushing 28 having screw-threaded engagement with a collar 29 rotatably mounted upon the cam collar 25. A spring 30 encircling said pin 27 acts normally to hold said pin 27 out of engagement with the holes 26 in the cam collar 25. The collar 29 is loosely mounted upon the cam collar 25 and has a handle 31 fast thereto by means of which it may be rocked upon the chuck member 9.

The general operation of the device hereinbefore specifically described is as follows: In assembling the parts the part 12 is inserted in the bore 17 of the shaft 5 at the forward end thereof. The part 13 of the chuck member 9 is inserted in said shaft 5 from the rear end thereof and said two parts 12 and 13 of the chuck member 9 are then screwed together. The cam collar 25 is then slipped onto the rear end of the part 13. The collar 29 is next slipped onto the cam collar 25. The hand wheel 19 is then slipped onto the rear end of the part 13, the screw 23 is screwed downwardly into the slot 24 and the set nut 21 is screwed onto the part 13 abutting against the hub 20 of the hand wheel 19.

The operator then places the work 18 within the gripping fingers 15 and pushes the pin 27 into one of the holes 26. He then rotates the collar 29 by means of its handle 31, thus, through the pin 27, rotating the collar 25 and, by reason of the cam-shaped end of the collar 25 which bears against the cam-shaped end of the hub 20, the hand wheel 19 and the chuck member 9 will be forced toward the left (Fig. 1), thus bringing the incline 16 of the fingers 15 against the forward end of the bore of the shaft 5 and forcing the fingers 15 toward each other, thus causing them to grip the work 18 firmly in order that the same may be operated upon in the usual manner. The shaft 5 may be prevented from rotating while the cam collar 25 is being rotated, as hereinbefore set forth, by holding the hand wheel 19 or by holding the pulley 7 stationary. When the machine is in operation to operate upon the work 18, the collar 29 and handle 31 remain stationary, as the collar 29 is loose upon the cam collar 25 and the handle 31 will be caused by gravity to stand in a perfectly perpendicular position, any tendency of the collar 29 to be rotated by friction will be overcome.

When it is desired to remove the work from the lathe the cam collar 25 is rotated, as hereinbefore described, but in the opposite direction, thus allowing the chuck member 9 to be moved forwardly and causing the fingers 15 to release the work 18 so that it may be removed from the lathe.

Having thus described my invention what I claim and desire by Letters Patent to secure is:

1. A chuck closer having, in combination, a hollow shaft, a chuck member extending through said shaft, gripping fingers on said chuck member at one end of said hollow shaft, adapted to engage said hollow shaft and be forced toward each other when said chuck member is moved longitudinally thereof in one direction, a cam fast to said chuck member, another cam rotatably mounted on said chuck member between said first-named cam and said shaft and bearing against the end of said shaft opposite that end thereof adjacent to said gripping fingers, means rotatably mounted on said last-named cam and a manually operable device to lock said last-named means and cam together whereby said chuck member may be moved longitudinally within said shaft and said fingers moved toward each other.

2. A chuck closer having, in combination, a hollow shaft, a chuck member extending through said shaft, gripping fingers on said chuck member at one end of said hollow shaft, adapted to engage said hollow shaft and be forced toward each other when moved longitudinally of said hollow shaft in one direction, a cam rotatably mounted on said chuck member and bearing against the opposite end of said hollow shaft from that at which said gripping fingers are located, a member fast to said chuck member and engaging said cam, and means to rotate said cam on said chuck member, whereby said chuck member may be moved longitudinally of said hollow shaft and said gripping fingers moved toward each other, a collar rotatably mounted upon said cam and a pin slidably mounted upon said collar and adapted to be moved into a hole provided in said cam, whereby, when said collar is rotated, said cam will be rotated and said chuck member moved longitudinally thereof to force said fingers toward each other.

3. A chuck closer having, in combination, a hollow shaft, a chuck member extending through said shaft, gripping fingers on said chuck member at one end of said hollow shaft, adapted to engage said hollow shaft and be forced toward each other when moved longitudinally of said hollow shaft in one direction, a cam rotatably mounted on said chuck member and bearing against the opposite end of said hollow shaft from that at which said gripping fingers are located, a member fast to said chuck member and engaging said cam and means to rotate said cam on said chuck member, whereby said chuck member may be moved longitudinally of said hollow shaft and said gripping fingers moved toward each other, a collar loosely mounted on said cam, a pin slidably mounted upon said collar and adapted to be moved into a hole provided in said cam, and a handle fast to said collar by means of which the same may be rotated, thereby imparting, in combination with said pin, a rotary movement to said cam and a longitudinal movement to said chuck member within said hollow shaft and forcing said gripping fingers toward each other.

4. A chuck closer having, in combination, a hollow shaft, a chuck member extending through said shaft, gripping fingers on said chuck member at one end of said hollow shaft, adapted to engage said hollow shaft and be forced toward each other when moved longitudinally of said hollow shaft in one direction, a cam rotatably mounted on said chuck member and bearing against the opposite end of said hollow shaft from that at which said gripping fingers are located, a member fast to said chuck member and engaging said cam and means to rotate said cam on said chuck member, whereby said chuck member may be moved longitudinally of said hollow shaft and said gripping fingers moved toward each other, a collar rotatably mounted upon said cam, a pin slidably mounted in said collar and adapted to engage a hole in said cam, and a spring acting to normally hold said pin out of said hole, whereby, when said pin is pushed into said hole and said collar rotated, said cam will be simultaneously rotated and said chuck member moved longitudinally thereof to force said fingers toward each other.

5. A chuck closer having, in combination, a hollow shaft, a chuck member extending through said shaft, gripping fingers on said chuck member at one end thereof adapted to engage said hollow shaft and be forced toward each other when moved longitudinally thereof in one direction, a hand wheel fast to said chuck member and adjustable longitudinally thereof, a hub on said hand wheel having one end thereof inclined to form a cam, a collar rotatably mounted upon said chuck member between said hand wheel and said shaft, one end thereof being inclined to form a cam and bearing against the inclined end of said hand wheel hub, the other end of said cam collar arranged to bear against the end of said shaft opposite that end at which said gripping fingers are located, said cam collar having a plurality of holes extending radially therethrough, a collar rotatably mounted upon said cam collar, and a pin slidably mounted on said last-named collar and adapted to project into any one of the holes in said cam collar, whereby, when said last-named collar is rotated, said cam collar will be rotated and said chuck member moved longitudinally thereof in said hollow shaft and said fingers forced toward each other.

In testimony whereof I have hereunto set my hand in presence of two subscribing witnesses.

ALBERT F. ROBBINS.

Witnesses:
CHARLES S. GOODING,
SYDNEY E. TAFT.

Copies of this patent may be obtained for five cents each, by addressing the "Commissioner of Patents, Washington, D. C."